April 29, 1947.  L. E. PAMPHILON  2,419,914
METHOD AND APPARATUS FOR DETECTING SUSPENDED MATTER IN FLUIDS
Filed Nov. 30, 1944
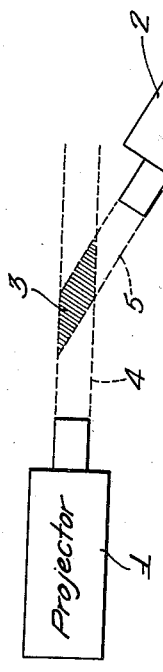
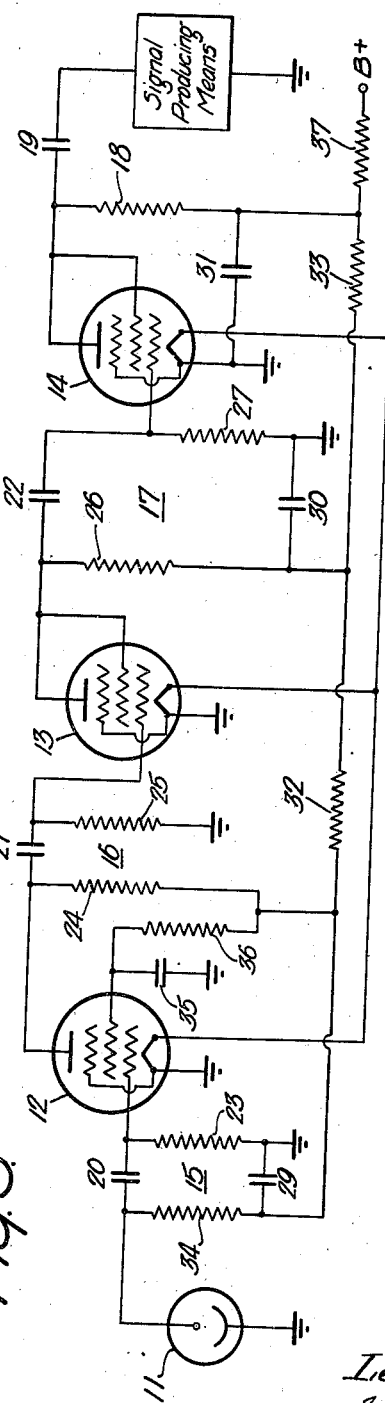
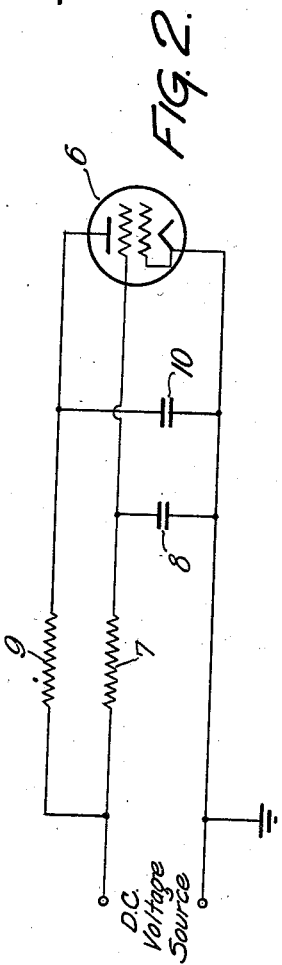
Inventor:
Leon E. Pamphilon
by his Attorneys
Howson & Howson Patented Apr. 29, 1947

2,419,914

UNITED STATES PATENT OFFICE 2,419,914

METHOD AND APPARATUS FOR DETECTING SUSPENDED MATTER IN FLUIDS

Leon E. Pamphilon, Yeadon, Pa., assignor to Airdesign & Fabrication, Inc., Upper Darby, Pa., a corporation of Pennsylvania Application November 30, 1944, Serial No. 565,983

19 Claims. (Cl. 250—41.5)

This invention relates to a novel method and apparatus for detecting and indicating the presence of suspended particles of matter in a fluid. While not limited to any specific use, the invention is particularly directed to the detection and indication of the presence of suspended matter in air, e. g. dust, water vapor, smoke, etc.

The principal object of the invention is to provide a novel method and apparatus for the stated purpose, which is highly efficient and reliable in operation, and which has distinct advantages as set forth hereinafter.

Another object of the invention is to provide a method and apparatus which utilizes reflected light from the suspended particles to detect the presence of such particles, and which is novelly characterized by the employment of an intermittently operable light source to produce a distinctive signal or indication.

A further object of the invention is to provide a novel apparatus for the stated purpose, which does not require adjustment to effect and maintain efficient and reliable operation.

Other objects and features of the invention will be apparent as the description proceeds.

In the accompanying drawing,

Figure 1 is a general illustration of the apparatus provided according to the invention;

Figure 2 is a circuit diagram of the projector unit of the apparatus; and

Figure 3 is a wiring diagram of the camera unit of the apparatus.

Referring first to Fig. 1, the apparatus provided in accordance with the present invention comprises a projector unit 1 and a camera unit 2, the structure of which will be described hereinafter. As illustrated, the projector is disposed so as to project light into a space or area designated generally by reference character 3. The camera unit 2 is disposed so that it does not receive light directly from the projector unit 1, but only receives light which is reflected by suspended particles of matter in a fluid within the space or area 3. Thus if the fluid within the space 3 is assumed to be air, the camera unit 2 will only receive light reflected by suspended particles of matter therein, such as dust, water vapor, smoke, etc.

In further accordance with the invention, the projector unit 1 is adapted to project light intermittently into the space or area 3. That is to say, the said unit projects successive flashes of light which occur at a predetermined rate or frequency. The successive light flashes are emitted by the projector unit in the form of a beam, as represented at 4. The camera unit 2 receives the reflected light flashes, as indicated at 5, whenever there are suspended particles of matter within the space 3 in the path of the light flashes emitted by the projector unit 1. As described hereinafter, the camera unit embodies means for translating the reflected light flashes into electrical current impulses which are utilized to give an indication of the presence of the suspended matter within the space 3.

Referring now to Fig. 2, the projector unit 1 may comprise any suitable controllable light source and means for effecting intermittent operation of the same. Preferably, however, the light source utilized is a triggerable electron tube having the capability of emitting sufficient light for the purpose of the present invention. Such a light source is available in the high light intensity gas discharge tube known as the strobotron. Such a device is shown in Fig. 2 at 6. A suitable source of D. C. voltage is connected between the cathode and control grid of the tube 6, as indicated. A resistor-capacitor combination 7—8 is arranged as illustrated, the resistor 7 being serially connected between the control grid of tube 6 and the high potential side of the D. C. source, while the capacitor 8 is connected directly between the control grid and the cathode of the tube. A second resistor-capacitor combination 9—10 is arranged as illustrated, the resistor 9 being serially included in a connection between the anode of tube 6 and the high potential side of the D. C. source, while the capacitor 10 is connected directly between the anode and the cathode of the tube. The purpose of the two capacitors 8 and 10 and their associated resistors 7 and 9 is to effect intermittent operation of the tube 6 so as to produce successive light flashes, as hereinbeforementioned. To this end, the time constant of the resistor-capacitor combination 9—10 is made considerably shorter than that of the resistor-capacitor combination 7—8. The reason for this will appear presently.

Assuming proper values of the circuit elements and the applied voltage, the circuit of Fig. 2 operates in the following manner: Initially the tube 6 is inoperative and the capacitors 8 and 10 are uncharged. The capacitor 10 is charged through its associated resistor 9 from the D. C. voltage source, while the capacitor 8 is likewise charged through its associated resistor 7. The function of the latter capacitor is to trigger the tube 6, while the function of capacitor 10 is to produce a high intensity flash due to the energy stored in this capacitor during the intervals between flashes. Thus when the capacitor 8 has been charged to a certain point, the tube 6 fires and a high intensity discharge takes place therein due to the energy stored in the condenser 10. The result is a high intensity light flash which is emitted from the projector unit shown in Fig. 1. The flash completely discharges the capacitors 8 and 10, and the cycle is repeated. By making the time constant of the elements 9 and 10 considerably shorter than that of the elements 7 and 8, as previously mentioned, it is assured that the capacitor 10 shall be charged to the full D. C. supply voltage before it is discharged by the action of the control grid.

By way of example, the circuit of Fig. 2 may employ a standard or conventional strobotron, e. g. the SN-4, and a D. C. voltage source of the order of 180-300 volts. The resistors 7 and 9 may have values of 250,000 ohms and 20,000 ohms, respectively. The capacitors 8 and 10 each may have a value of .5 microfarad. Where sufficient power is available, as where a rectified A. C. power source is used, capacitor 10 may have a larger value, e. g. 1 microfarad, to produce a more brilliant flash.

Referring now to Fig. 3, there is illustrated a specific embodiment of the camera unit 2. This unit comprises a suitable light-sensitive device or photocell 11 which is sensitive to the light spectrum of the strobotron, such as the type 924 photocell unit. The photocell is connected to a suitable amplifier, such as the three-stage amplifier shown in Fig. 3. Since the present invention is not concerned with the specific details of the amplifier shown, it is deemed unnecessary to describe the amplifier in detail, the electrical connections of which are clearly shown. It may be noted, however, that the amplifier shown comprises pentodes 12, 13, and 14 together with suitable resistance-capacitance coupling networks designated generally by reference characters 15, 16, and 17. The output of the amplifier shown is derived from across the load resistor 18 of the last tube 14, by way of the coupling condenser 19.

In an amplifier according to Fig. 3 employing type 1S5 tubes, a "B" supply of 90 volts and an "A" supply of 1.5 volts, the elements had the following values. The coupling condensers 19, 20, 21 and 22 each had a value of .001 microfarad. The resistors 23, 24, 25, 26, 27 and 18 each had a value of 1 megohm. The condensers 29, 30 and 31 each had a value of .1 microfarad. The resistors 32 and 33 each had a value of 100,000 ohms. The remaining elements had values as follows:

Resistor 34—5 megohms
Condenser 35—.01 microfarad
Resistor 36—3 megohms
Resistor 37—10,000 ohms The photocell and the associated amplifier, as represented in Fig. 3, together produce a sensible signal which may be utilized in any desired manner. For example, the output of the amplifier may be connected to a loud-speaker system for oral monitoring. For high efficiency of operation (low power consummation) particularly where the available power is limited as where a battery source is used, the rate of flash of the gas discharge tube of the projector unit may be adjusted to give approximately two flashes per second. This will result in a series of ticks which may be heard over the loudspeaker monitoring system when suspended particles of matter are present in the space under observation. When an A. C. supply is used, allowing higher current drain, the rate of flash may be made several hundred cycles per second. This will give a somewhat musical note from the monitoring system whenever suspended matter is present in the space under observation.

The output of the amplifier may also be supplied to a suitable rectifier and relay system to control warning lights or a warning bell, or it may be supplied to an amplifier channel feeding into telephone lines or a radio transmitter to convey the signal to some remote point. Under actual test conditions, employing a simple battery operated system of the character illustrated, it has been found possible to detect water vapor and smoke which are present in such small quantities as to be completely invisible to the unaided eye.

While the projector and camera units should be located in an area which is reasonably dark, absolute darkness is not required. Suitable lens shields may be provided on the two units to prevent stray light from passing directly from one to the other. It will be apparent, of course, that the surroundings should be such that no light is reflected from walls or other surfaces into the camera unit.

The apparatus provided by the present invention is particularly advantageous in that it requires no balance adjustment such as is necessary in devices heretofore employed for the same purpose. Consequently the apparatus may be constructed and set up and need not be readjusted during the life of the tubes and other components. The apparatus and method employed have the further advantage that no reflectors or mirrors are used, which tend to accumulate dirt and thus lessen the efficiency of operation.

The flasher apparatus of Fig. 2 is also advantageous in that the timing is readily controlled by the values assigned to the elements 7 and 8 which are independent of the flasher energy circuit 9—10. Moreover, the flasher circuit is extremely simple, employing a single tube.

While the invention has been described with reference to a specific embodiment, it is not limited thereto but is capable of various modifications within the scope of the appended claims.

I claim:

1. A method of detecting and indicating the presence of suspended particles of matter in a fluid, which comprises projecting light intermittently into a space containing said fluid, translating only the light reflected by said particles into electrical impulses, and utilizing said impulses to produce a sensible signal.

2. A method of detecting and indicating the presence of suspended particles of matter in a fluid, which comprises projecting light intermittently into a space containing said fluid, translating only the light reflected by said particles into electrical current impulses, and translating said current impulses into a sensible signal.

3. A method of detecting and indicating the presence of suspended particles of matter in a fluid, which comprises projecting light intermittently at an audio frequency rate into a space containing said fluid, translating only the light reflected by said particles into electrical current impulses occurring at said rate, and translating said audio frequency current impulses into an audible signal.

4. Apparatus for detecting and indicating the presence of suspended particles of matter in a fluid, comprising means for projecting light intermittently into a space containing said fluid, means for translating only the light reflected by said particles into electrical impulses, and means for utilizing said impulses to produce a sensible signal.

5. Apparatus for detecting and indicating the presence of suspended particles of matter in a fluid, comprising means for projecting light intermittently at an audio frequency rate into a space containing said fluid, means for translating only the light reflected by said particles into electrical impulses occurring at said rate, and means for translating said audio frequency impulses into an audible signal.

6. Apparatus for detecting and indicating the presence of suspended particles of matter in a fluid, comprising means for projecting light intermittently into a space containing said fluid, photo-electric means arranged to receive only light reflected by said particles, whereby said photo-electric means is activated only if said particles are present, and means operable by said photo-electric means to produce a sensible signal.

7. Apparatus for detecting and indicating the presence of suspended particles of matter in a fluid, comprising means for projecting light intermittently into a space containing said fluid, photo-electric means arranged to receive only light reflected by said particles, whereby said photo-electric means is activated only if said particles are present, an electron tube amplifier connected to said photo-electric means, and a signal producing means connected to said amplifier.

8. Apparatus for detecting and indicating the presence of suspended particles of matter in a fluid, comprising an electron tube adapted to serve as a light source and arranged to project light into a space containing said fluid, means for operating said tube intermittently to produce successive light flashes, photo-electric means arranged to receive only light reflected by said particles, whereby said photo-electric means is activated only if said particles are present, and means operable by said photo-electric means to produce a sensible signal.

9. An apparatus as defined in claim 8, wherein said electron tube is of the triggerable gas-filled type.

10. An apparatus as defined in claim 8, wherein said electron tube is of the triggerable gas-filled type, said apparatus including energy storage means for operating said tube, and means for triggering the tube.

11. An apparatus as defined in claim 8, wherein said electron tube is of the triggerable gas-filled type, said apparatus including a first resistor-capacitor combination arranged to supply energy to said tube, and a second resistor-capacitor combination arranged to trigger said tube.

12. Apparatus for detecting and indicating the presence of suspended particles of matter in a fluid, comprising a gas-filled electron tube adapted to serve as a light source and arranged to project light into a space containing said fluid, said tube including an anode, a cathode, and a control electrode, a source of electrical energy connected to said anode and said cathode, a first capacitor connected between said anode and said cathode, and adapted to store energy from said source and to supply the energy to said tube, a first resistor serially connected with said capacitor and said energy source, a second capacitor connected between said cathode and said control electrode and also connected across said energy source, a second resistor serially connected with said second capacitor and said source, said second capacitor serving to trigger said tube so as to produce successive light flashes, photo-electric means arranged to receive only light reflected by said particles, whereby said photo-electric means is activated only if said particles are present, and means operable by said photo-electric means to produce a sensible signal.

13. An apparatus as defined in claim 12, wherein said first capacitor and said first resistor have a predetermined time constant, said second capacitor and said second resistor also have a predetermined time constant, and the first-mentioned time constant is less than the second-mentioned time constant.

14. In combination, a normally non-conductive electron discharge device adapted to emit light during the discharge thereof, said device including an electron-emitting electrode, an electron-receiving electrode, and a control electrode, an energy-storage device connected between said first two electrodes, means for storing energy in said second device, and means connected to said control electrode for successively and intermittently rendering said first device conductive, whereby to cause successive and intermittent operation of said first device by the energy stored in said second device.

15. In combination, a normally non-conductive electron discharge device adapted to emit light during the discharge thereof, said device including an electron-emitting electrode, an electron-receiving electrode, and a control electrode, a source of electrical energy connected to said first two electrodes, a first capacitor connected between said first two electrodes and adapted to store energy, a second capacitor connected between said control electrode and said electron-emitting electrode and also connected across said energy source, and a resistor serially connected with said second capacitor and said energy source, said second capacitor and said resistor serving to render said device conductive successively and intermittently, whereby said first capacitor successively discharges its stored energy through said device to produce successive light flashes.

16. Apparatus for detecting and indicating the presence of suspended particles of matter in a fluid, comprising a normally non-conductive discharge device adapted to emit light during the discharge thereof and arranged to project such light into a space containing said fluid, said device including an electron-emitting electrode, an electron-receiving electrode, and a control electrode, an energy-storage device connected between said first two electrodes, means for storing energy in said second device, means connected to said control electrode for successively and intermittently rendering said first device conductive, whereby to cause successive and intermittent operation of said first device by the energy stored in said second device, thus causing said first device to produce successive light flashes, photo-electric means arranged to receive only the light reflected by said particles, whereby said photo-electric means is activated only if said particles are present, and means operable by said photo-electric means to produce a sensible signal.

17. Apparatus for detecting and indicating the presence of suspended particles of matter in a fluid, comprising a normally non-conductive discharge device adapted to emit light during the discharge thereof and arranged to project such light into a space containing said fluid, said device including an electron-emitting electrode, an electron-receiving electrode, and a control electrode, a source of electrical energy connected to said first two electrodes, a first capacitor connected between said first two electrodes and adapted to store energy, a second capacitor connected between said control electrode and said electron-emitting electrode and also connected across said energy source, a resistor serially connected with said second capacitor and said energy source, said second capacitor and said resistor serving to render said device conductive successively and intermittently, whereby said first capacitor successively discharges its stored energy through said device to produce successive light flashes, photo-electric means arranged to receive only the light reflected by said particles, whereby said photo-electric means is activated only if said particles are present, and means operable by said photo-electric means to produce a sensible signal.

18. In combination, a normally non-conductive electron tube including a cathode, a control grid and an anode, a source of unidirectional voltage connected between said cathode and said anode, a first capacitor connected between said cathode and said anode for storing energy from said source, a connection between said source and said grid, and means including a second capacitor connected between said grid and said cathode for successively and intermittently rendering said tube conductive, whereby to cause successive and intermittent operation of said tube by the energy stored in said first capacitor.

19. The combination according to claim 18, wherein said tube is of the triggerable gas-filled type.

LEON E. PAMPHILON.

REFERENCES CITED

The following references are of record in the file of this patent:

UNITED STATES PATENTS

| Number | Name | Date |
|---|---|---|
| 1,728,929 | Ernst et al. | Sept. 24, 1929 |
| 2,185,361 | Towne | Jan. 2, 1940 |
| 1,937,722 | Simon et al. | Dec. 5, 1933 |
| 1,901,570 | Vedder et al. | Mar. 14, 1933 |
| 2,216,575 | Seinfeld et al. | Oct. 1, 1940 |

FOREIGN PATENTS

| Number | Country | Date |
|---|---|---|
| 497,491 | British | Dec. 21, 1938 |
| 511,083 | British | Aug. 14, 1939 |

OTHER REFERENCES

Weston Smoke Alarm Publication, pp. 3, March 6, 1935. (Copy in U. S. Patent Office, Div. 54.)